United States Patent [19]
Wolfe et al.

[11] Patent Number: 4,462,816
[45] Date of Patent: Jul. 31, 1984

[54] METHOD FOR MAKING SINTERED SILICON NITRIDE ARTICLES

[75] Inventors: Robert W. Wolfe, Wysox; Joseph J. Cleveland, Towanda, both of Pa.

[73] Assignee: GTE Products Corporation, Stamford, Conn.

[21] Appl. No.: 502,413

[22] Filed: Jun. 8, 1983

[51] Int. Cl.³ .................... C03D 25/02; C04D 35/56
[52] U.S. Cl. ............................................ 65/23; 65/36; 65/42; 65/60.8; 65/112; 264/62; 264/332; 264/109; 427/300; 427/376.2
[58] Field of Search ............... 65/17, 18.1, 36, 42, 65/56, 60.8, 23, 112; 427/300, 369, 370, 376.2; 264/62, 332, 531

[56] References Cited
U.S. PATENT DOCUMENTS

| | | |
|---|---|---|
| 2,856,377 | 3/1959 | Retzer et al. ............... 65/42 X |
| 3,097,959 | 7/1963 | Zackman ................... 427/300 X |
| 3,875,277 | 4/1975 | Bratton et al. .............. 264/332 X |
| 4,112,143 | 9/1978 | Adlerborn et al. ............ 427/191 |
| 4,215,088 | 7/1980 | Ardary ....................... 264/332 |
| 4,242,294 | 12/1980 | Hüther et al. ................ 264/62 |
| 4,256,688 | 3/1981 | Adlerborn et al. .......... 264/332 X |
| 4,351,858 | 9/1982 | Hunold et al. ................ 427/193 |

FOREIGN PATENT DOCUMENTS 1522705 8/1978 United Kingdom .

Primary Examiner—Robert L. Lindsay, Jr.
Attorney, Agent, or Firm—James Theodosopoulos

[57] ABSTRACT

In the manufacture of sintered silicon nitride articles by hot isostatic pressing, multiple silicon nitride parts are encapsulated within a single capsule for the pressing operation. Suitable spacers placed between the parts ease separation thereof after sintering.

9 Claims, 5 Drawing Figures

METHOD FOR MAKING SINTERED SILICON NITRIDE ARTICLES

This invention is concerned with the manufacture of sintered silicon nitride articles by means of hot isostatic pressing, such as is shown in U.S. Pat. Nos. 4,351,858, 4,256,688 and 4,112,143 and British Pat. No. 1,522,705. The patents disclose (1) the pressing of silicon nitride powder into a preform, (2) encapsulating the preform in a material that is impermeable to the pressure medium (usually a gas) that is used in the hot isostatic pressing operation and which is plastic at the hot isostatic pressing conditions, and (3) hot isostatic pressing the encapsulated preform. The patents disclose hot isostatic pressing of only a single part at a time. This invention is concerned with the hot isostatic pressing of more than one part at a time, for reasons of economy of production.

In this invention, two or more preforms are stacked together and are then encapsulated within a single capsule to be hot isostatically pressed. In order to prevent the preforms from diffusion-bonding to each other during hot isostatic pressing, suitable refractory spacers are placed therebetween. The spacers must be inert with respect to the silicon nitride preforms and must have a melting point greater than the hot isostatic pressing temperature. If the spacer material, for example, alumina, is insufficiently inert with respect to the silicon nitride preforms, the alumina spacer may be coated with boron nitride to provide the desired inertness. In some cases it may be desirable to completely wrap the stack of preforms in a suitable metal foil prior to encapsulating the stack in a capsule, the reason being to prevent any loose particles of powder that may be present on the stack from interfering with the formation of a sealed capsule.

Figure 1:
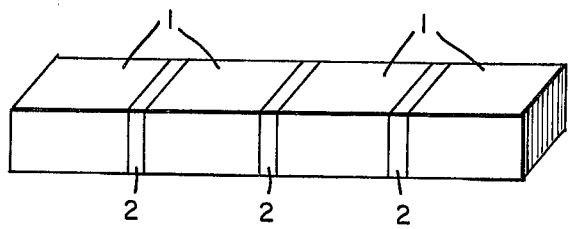
FIG. 1 shows a stack of preforms separated by spacers.
Figure 2:
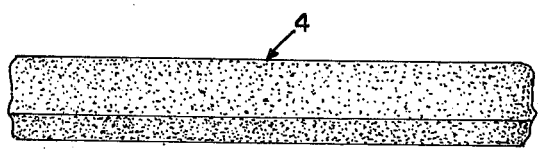
FIG. 2 shows the stack wrapped in metal foil.
Figure 3:
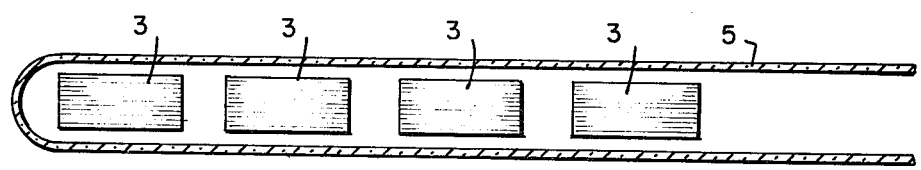
FIG. 3 shows several spaced-apart wrapped stacks within an open-ended glass tube.
Figure 4:
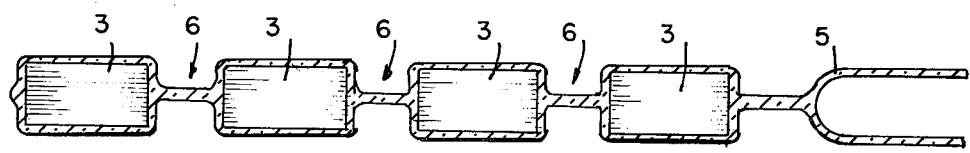
FIG. 4 shows the glass completely collapsed around each stack.
Figure 5:
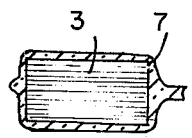
FIG. 5 shows an encapsulated stack cut apart from the others and ready for hot isostatic pressing.

In one example of this invention, cutting tool blanks, or preforms 1, were pressed from silicon nitride powder having an average particle size of about one micron and containing about 6% of an organic binder, for example, stearic acid and/or carbowax, in a die at a pressure of about 50,000 psi. Preforms 1 were ½ inch square by 3/16 inch thick. The purpose of the binder was to give the preforms serviceable green strength. Spacers 2 were then pressed in the same die at about the same pressure from boron nitride powder having an average particle size of about one micron and containing about 10% of the same binder. Spacers 2 were ½ inch square by 50 mils thick. Preforms 1 and spacers 2 were then heated at 550° C. for 2 hours to drive off the binders. Stack 3 was then formed by assembling six preforms 1 with spacers 2 separating the preforms from each other, as shown in FIG. 1. In order to give stack 3 adequate strength for handling, a boron nitride coating was applied between each preform 1 and spacer 2 and was applied over the outside of stack 3. The boron nitride coating was applied from a suspension of fine boron nitride particles in an aqueous binder solution. Stack 3 was then heated at 550° C. for 72 hours to drive off the water and binders and to thoroughly dry the stack. The height of stack 3 was about 1½ inches. Stack 3 was then wrapped in a 2½ inch by 5 inch sheet of ½ mil molybdenum foil 4 so that all six surfaces of stack 3 were covered. Stack 3 was then inserted into horizontal glass tube 5 which was sealed at one end. The inside diameter of glass tube 5 was about 2 mm greater than the largest cross sectional dimension of stack 3; the length of glass tube 5 was 36 inches. Glass tube 5 was made of a glass of high silica content such as Vycor. Ten foil wrapped stacks 3 were inserted into glass tube 5 leaving a space of about 1½ inches between stacks 3. Glass tube 5 was then carefully inserted into a furnace in a horizontal position, in order to maintain the 1½ inch spacing between stacks 3, and was heated to the softening point of the glass, about 1400° C., while a vacuum of about 500 microns was drawn on the open end of glass tube 5. After the glass collapsed around each stack 3, as shown in FIG. 4, the collapsed tube was removed from the furnace and cooled. After cooling, the collapsed tube was cut through at spaces 6 between stacks 3 with a diamond saw, leaving each stack 3 enclosed in a sealed glass capsule 7, as shown in FIG. 5. Each capsule 7 was then hot isostaticly pressed, as shown in the above mentioned patents, in an argon atmosphere at a maximum temperature of 1800° to 1900° C. and a maximum pressure of about 20,000 psi. After cooling, capsule 7 was removed by breaking it, metal foil 4 was removed from around stack 3, and cutting tool blanks 1 were easily separated from each other because of spacers 2 inbetween.

The silicon nitride may contain sintering-promoting additives such as magnesia as disclosed in the above mentioned patents, or other property modifiers, for example, titanium carbide to modify hardness or alumina to modify thermal conductivity.

Other refractory materials that may be used for spacer 2 are alumina, spinel, magnesia, zirconia and rare earth oxides, for example, lanthana, yttria and ceria. In the event that such materials are insufficiently inert with respect to silicon nitride, the boron nitride coating theron will prevent direct contact with the silicon nitride preform and thereby prevent direct contact with the silicon nitride preform and thereby prevent reaction therebetween.

If desired, only one stack 3 need be encapsulated at a time. In such a case, glass tube 5 could be shorter than when multiple stacks are encapsulated in one glass tube.

We claim:

1. In the process of making a sintered silicon nitride article by pressing a preform from silicon nitride powder and then isostatically pressing the preform at high temperature and high pressure to make the sintered silicon nitride article, the improvement which comprises the steps of assembling a plurality of such preforms in a stack with spacers separating the preforms from each other, the spacers comprising material that is inert with respect to the silicon nitride preforms and having a melting point above the isostatic pressing temperature, enclosing the stack in a sealed glass capsule, hot isostatically pressing the glass capsule, removing the glass from around the stack, and then separating the sintered silicon nitride articles from each other, the separating step being eased because of the spacers.

2. The process of claim 1 wherein the spacers have the same shape as the preforms but are thinner.

3. The process of claim 1 wherein the preforms are made by pressing the silicon nitride powder in a die and the spacers are made by pressing the spacer material in powder form in the same die.

4. The process of claim 1 wherein the spacer boron nitride.

5. The process of claim 1 wherein the spacer material comprises spinel coated with boron nitride.

6. The process of claim 1 wherein the spacer material comprises alumina coated with boron nitride.

7. The process of claim 1 wherein the spacer material comprises magnesia coated with boron nitride.

8. The process of claim 1 wherein the spacer material comprises zirconia coated with boron nitride.

9. The process of claim 1 wherein the spacer material comprises a rare earth oxide coated with zirconia.

* * * * *